United States Patent Office 3,393,652
Patented July 23, 1968

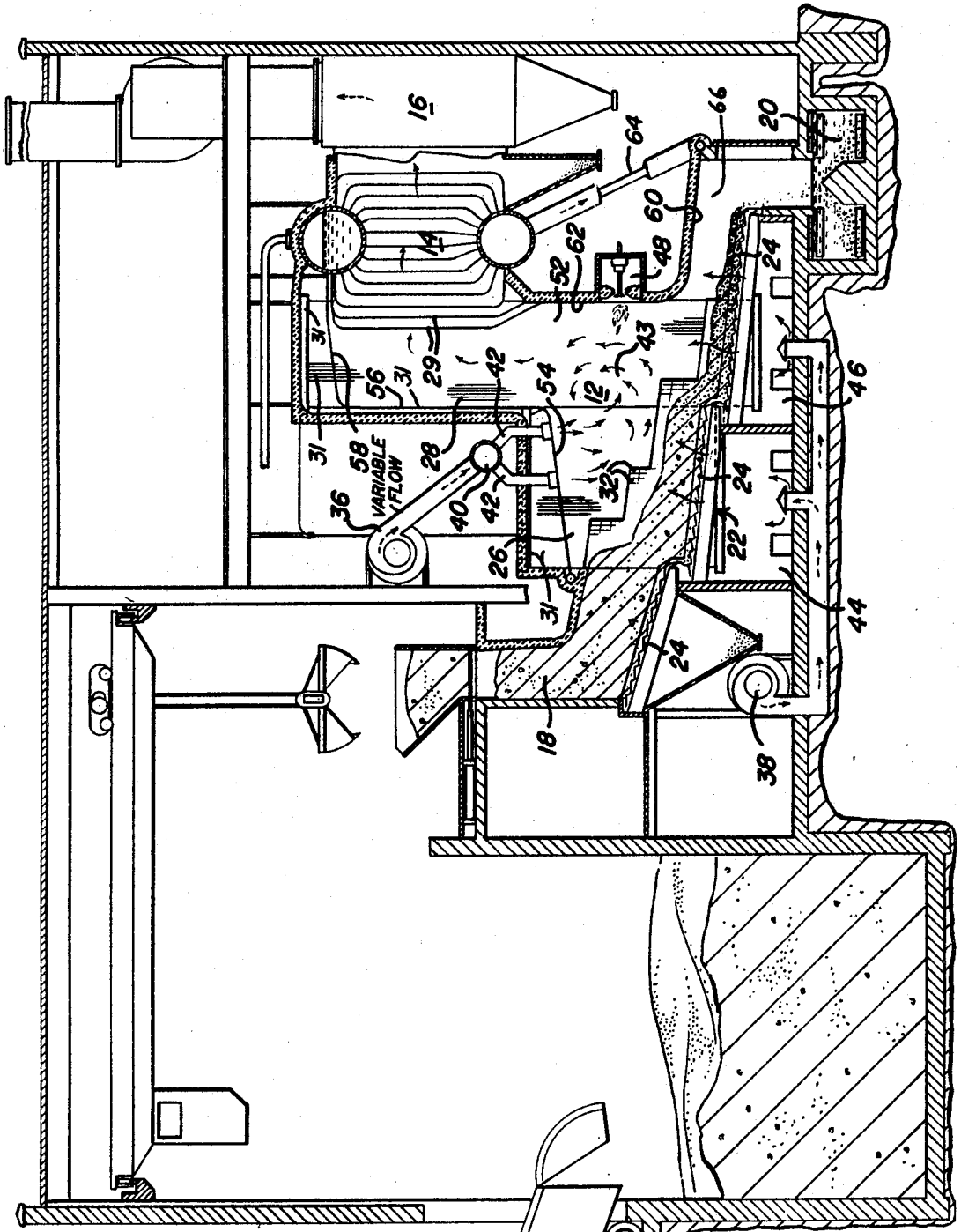

3,393,652
REFUSE DISPOSAL SYSTEM
John M. Connell, Mountain Lakes, N.J., assignor to Foster Wheeler Corporation, Livingston, N.J., a corporation of New York
Filed Oct. 7, 1966, Ser. No. 585,121
5 Claims. (Cl. 110—10)

ABSTRACT OF THE DISCLOSURE

A water cooled furnace for the combustion of refuse having a primary burning zone with roof combustion air inlet means arranged to maintain the combustion flame close to the refuse.

---

This invention relates to an incinerator especially adapted for the combustion of refuse, and in particular, a novel refuse burning furnace in which heat recovery is an important function.

Furnaces adapted for the combustion of refuse are well known, and on occasion, these furnaces have been associated with heat recovery systems. Conventionally, however, such furnaces have used refractory surfaces in the combustion area requiring a bulky expensive type of construction. The reason for this is that most refractory furnaces use very excessive amounts of air, as much as 600% of the theoretical combustion air required, in order to cool the refractory, lowering the overall temperature and thereby avoiding excessive refractory maintenance. The large amount of air has the disadvantage, however, in that it requires oversizing such components as stack fans, fly ash collectors and the stack itself, wherein the sizing is based upon total weight of the combustion product. Further, in spite of this precaution, furnace refractories must be replaced frequently in part, and complete furnace relinings are required about every two years.

The combustion of refuse up to the present time also has been a relatively inefficient process. The refuse contains a high quantity of water, and properly controlled burning with a predetermined correct amount of air is not readily achieved in the conventional refractory furnace.

Efficient steam generating units having feeding grates available for waste fuels such as coffe grounds, peanut shells, bagasse and bark generally are not suitable for the combustion of ordinary household refuse as they are designed for a fuel having a more uniform consistency than that obtainable in ordinary refuse. Whereas coffee grounds will burn at a more predictable rate, refuse will not burn-out within a predetermined time or at a predetermined point in travel through a furnace.

As the amount of refuse available particularly in urban centers increases annually at a rapid rate, this potential heat source for such services as desalination, for space heating, or the generation of electricity cannot be ignored.

Accordingly, it is an object of the present invention to provide a steam generating and combustion unit particularly adapted for the efficient combustion of ordinary household refuse.

It is a further object of the present invention to produce a refuse burning unit which is inexpensive in design and construction, and which requires little maintenance.

In accordance with the invention, there is provided in an incinerator for the combustion of ordinary household refuse, a combustion chamber, and a heat recovery section removed from the combustion chamber and arranged to receive heat from the combustion chamber. The combustion chamber is provided with an inclined feeding grate, and a unique furnace design in which the combustion flame is localized close to the refuse to promote further combustion. All of the walls, and the roof of the combustion chamber are water-cooled to avoid the use of furnace refractories, the construction of the walls and roof comprising an all-welded integral finned tube construction which is gas tight. Means are provided for introducing a limited and calculable amount of combustion air, so that the sizes of the fans, furnace volume, offtakes, fly ash collectors and stacks are limited to reasonable dimensions. The air introducing means includes roof combustion air nozzles disposed to hold the combustion flame close to the surface of the refuse.

Preferably, the combustion chamber comprises a first burning section opening into an upright furnace section, in the latter of which the gas temperatures are reduced to design temperatures of the heat recovery section.

Further aspects of the invention, and advantages thereof will become apparent upon consideration of the following specification, with reference to the accompanying drawing, in which The figure is a side section view of a refuse combustion unit in accordance with the invention.

Referring to the drawings, the refuse disposal unit comprises a furnace chamber 12 in communication with a heat recovery section 14, followed by a fly ash dust collector 16 leading to the unit stack. The refuse disposal unit is provided with a refuse inlet chute 18 and a water sealed ash removal outlet 20. Between the inlet chute 18 and outlet 20, the floor 22 of the furnace chamber 12 and chute 18 comprises a plurality of inclined burning grates 24 designed to move the refuse in a tumbling type movement from the chute to the outlet. The grates are generally inclined downwardly in the direction of the outlet to assist in movement of the refuse.

The furnace chamber 12 comprises a primary burning section 26 leading from the chute 18, and an upright furnace section 28 in communication with the open end of the burning section 26. The upright section 28 at its upper end is in communication with the heat recovery section 14, through screen tubes 29.

As an important feature of the invention, the furnace chamber 12, on all walls and the roofs thereof, is lined with parallel finned tubes welded together along their lengths to provide an air tight construction. The water cooled construction of the walls and roofs of the furnace chamber 12 is schematically illustrated and designated by reference numeral 31. By the use of well known scalloped bars (not shown) welded between the vertical side wall tubes and roof tubes, and other such constructions, the furnace is made substantially air tight and can be pressurized with a predetermined and desired amount of air. The sealed ash removal outlet 20 is necessary for this purpose.

The use of water walls throughout the furnace chamber eliminates the need for refractory, particularly in zones of high burning intensity, with the particular advantage that the units in accordance with the invention are capable of continuous operation for substantial periods of time, with only short pauses necessary for periodic maintenance. In addition, a large amount of excess air is no longer required for cooling purposes, and components of the unit can correspondingly be reduced to reasonable sizes. Further, the air tight non-refractory construction permits the addition of the proper amount of combustion air for combustion of the low heat value wet refuse.

In the lower portion of the primary burning section 26 of the furnace chamber 12, a large number of cast iron plates 32 are bolted tightly to the water cooled walls extending a sufficient height upwardly along each wall in the furnace chamber to provide a wear surface for protection against abrasion by the traveling refuse. In the inlet end of the primary burning section 26, the cast iron plates are disposed well up the wall to near the top thereof, taking into consideration the height of the refuse at this point, whereas further removed from the inlet end, the top edges of the cast iron plates are lower, for the lower level of refuse as burning takes place. These plates can be of any suitable configuration, and generally are cast to conform to the inner surface of the water cooled walls, being flat on the inner side and suitably indented on the back side for continuous overall contact with the tube surface in back of the plates. This provides for optimum transmission of heat to the tubes.

Separate blowers 36 and 38 provide for the admission of combustion air into the furnace chamber 12, through the roof and floor of the combustion chamber respectively. The air from blower 36 enters plenum chamber 40 from which it is diverted into at least two and preferably a moderate number of ducts 42 in communication with the furnace chamber through apertures in the roof of the burning section 26. Generally these apertures will be disposed in rows laterally across the primary burning section 26, one of the rows being very close to the junction between the burning section 26 and upright furnace section 28, the other being removed from the first row somewhat in the direction of the inlet chute 18. The primary purpose of these apertures is to confine the ball of flame 43 or burning in the primary burning section above the layer of refuse. The nozzles create an adjustable air blanket (by virtue of the ability to adjust the amount of air forced in through blower 36) that acts as an arch with a height that can be varied. An operator may adjust the flame pattern as the characteristics of the fuel change.

The blower 38, which also can introduce a variable amount of air into the primary burning section 26, forces air into two plenum chambers 44 and 46 beneath the center and outlet end sections of the floor. The air is regulated to either compartment by dampers (not shown). The stoker grate surface is 93% cast iron with 7% air openings, to permit the flow of air therethrough, while the amount of siftings falling through these openings is small. Shelves are provided beneath the grate sections to catch the siftings, and the shelves can be cleaned on a scheduled basis.

One of the principal purposes of a unit of this type is to achieve continuous operation and the generation of a predetermined and desired amount of steam per hour. In the event insufficient refuse is available or in the event of malfunction of any of the refuse handling components, an oil burner 48 is provided in an end wall of the furnace chamber (removed from the chute 18) designed to direct a flame into the vicinity of the burning area of the burning section 26. The burner includes a known air register with adjustments capable of changing the shape and length of the flame and thus location of the burning zone above the refuse. This also permits an operator to adjust the location and shape of the flame to adapt to the requirements of different fuels.

In a typical unit, the burner 48 together with an independent air supply is alone sufficient to fire enough oil for 60,000 pounds of steam per hour at 275 pounds per square inch gage.

In the construction of the furnace, large components of the unit can be shop assembled and then joined at the field or unit location. The furnace chamber 12 comprises primarily four tube panels, the opposed side wall panels 52 having vertically extending tubes, a front panel which constitutes the front arch 54 above the primary burning section 26, the front wall 56 of the upright furnace section 28, and the roof 58 of this section. The rear panel constitutes the rear arch 60 of the unit and a slag screen portion 62 in which the burner 48 is located. Above the slag rear wall, the tubes of the rear panel separate to provide a screen 29 between the furnace section and the heat recovery section.

One advantage in the use of water cooled walls is that slag particles do not adhere to the walls; instead, they cool rapidly and fall off the walls. Conventionally, slag adhesion is a problem in refractory units wherein the slag chills on the refractory walls, and in collecting and dropping off breaks off refractory material, requiring frequent replacement of the refractory.

It should be noted that the cross-section of the furnace chamber 12 is unique, in that the primary burning section is comprised of diverging floor and roof areas (22 and 54 respectively). The purpose of this is to accommodate for the expanding volume of combustion gas as burning takes place, but at the same time, provide a means for keeping the combustion flame as close to the burning refuse as possible to promote additional burning. The enlarged end of the first burning section forms the junction between the primary burning section and the upright portion of the combustion chamber. The height of the upright portion is dictated by the amount of cooling desired of the combustion gases prior to impinging upon heat recovery surfaces (dictated by requirements of the heat recovery surface), generally so that the temperatures of the combustion gases are lowered to about 1500° F. prior to entering the heat recovery zone. At the exit of the heat recovery zone, temperatures have been reduced to about 600° F.

The closeness of the arch or roof in the primary burning section to the refuse permits the use of the combustion air as a means for forcing combustion to take place close to the surface of the refuse and to thereby further ensure ignition.

One advantage in particular should be apparent, namely that the controlled amount of excess air for burning, in the order of 30%, as compared to 600% excess air in conventional units, achieves better burning, and at the same time enables the reduction in size of components of the unit. For instance, the dust collector 16 for the unit may be a third of the size and cost of the dust collectors of conventional units.

The heat recovery section 14 of the unit is conventional comprising banks of tubes extending between a mud drum and steam drum. A downcomer 64 from the mud drum feeds the rear wall panel 60, 62 of the furnace chamber 12.

The furnace chamber also is provided with a rear burning area 66 wherein the roof 60 is close to the refuse surface, for the purpose of promoting combustion of the residual refuse left on grate 24 at this point. That is, the arch holds the flame in this area close to the refuse surface to facilitate burning. Air inlets may also be provided if desired in the roof 60 of the rear burning area 66 to provide an adjustable arch or means for raising and lowering the flame in this area from or to the surface of the refuse.

Although the invention has been described in detail with reference to a particular design, modifications within the scope of the invention as defined in the following claims will be apparent to those skilled in the art.

What is claimed is:
1. An incinerator for refuse comprising
an elongated combustion chamber including an inlet and an opposed outlet end;
a floor for said combustion chamber including adjacent said inlet end a refuse supporting grate means disposed in a slightly downwardly extending plane leading from said inlet end;
wall and roof means for said combustion chamber;
said roof means adjacent the combustion chamber inlet end being disposed relatively close to the grate means and lying in a plane extending upward from said inlet end and diverging from said grate means and providing therewith and with the portions of said side wall means adjacent said inlet end a primary burning zone;

the entire wall and roof means having panels of parallel fluid cooled tubes welded together to define a relatively gas-tight combustion chamber;

duct means disposed in said roof means adjacent said inlet end in the combustion zone adjustably injecting combustion air downwardly over the refuse in said primary burning zone, thereby providing an adjustable arch which controls the level of the flame in the primary burning zone relative the surface of the refuse; and further duct means beneath said grate means to inject additional combustion air therethrough.

2. An incinerator according to claim 1 wherein said wall means comprise opposed side walls and an end wall opposite said inlet end, said side walls comprising parallel fluid cooled tubes extending vertically from the plane of said grate means to said roof means.

3. An incinerator according to claim 2 including a plurality of adjacent side by side cast iron plates affixed to said wall means on the inside surface thereof;

the plates covering a surface of the wall means adjacent the grate means extending upwardly a distance sufficient to protect the wall means against abrasion from the travelling refuse.

4. An incinerator according to claim 2 further including in said end wall burner means approximately on the same horizontal plane as said primary burning zone, said burner means directing a flame into the vicinity of said primary burning zone to maintain the position of the flame in the burning zone longitudinally at a predetermined distance from the incinerator inlet end.

5. An incinerator for refuse comprising a combustion chamber;

a heat recovery section removed from the combustion chamber arranged to receive heat from the combustion chamber;

the combustion chamber comprising opposed inlet and outlet ends removed approximately horizontally from each other;

grate means between the inlet and outlet ends by which refuse is moved through the combustion chamber, the grate means defining a somewhat horizontal but slightly inclined floor of the combustion chamber;

upright wall and approximately horizontal roof means extending from said inlet end and defining a primary confined burning section of the combustion chamber wherein the roof is sufficiently close to the combustion chamber floor to confine the combustion flame to an area close to and above the layer of refuse on the grate means;

the primary burning section having an inlet end constituting the inlet of the combustion chamber and an opposed open end;

air nozzle means adapted to introduce a limited amount of combustion air into the combustion chamber, including blower means by which the amount of air can be varied, said nozzle means being disposed in the roof means of the primary burning section positioned in the section [at at least two longitudinally spaced apart intervals] to create an adjustable air blanket over the burning refuse acting as an adjustable arch the height of which can be varied;

further nozzle means beneath said grate means to inject additional combustion air therethrough;

wall and roof means defining an upright furnace section of the combustion chamber communicating with said primary burning section at the open end thereof, and extending upwardly above the roof means of the primary burning section and in communication with said heat recovery section;

end wall means adjacent said combustion chamber outlet end;

burner means in said end wall means on approximately the same horizontal plane with said primary burning section adapted to introduce a flame into the vicinity of the burning section and to maintain the position of the flame longitudinally in the combustion chamber a predetermined distance from the inlet end;

the entire wall and roof means of both said primary burning and upright furnace sections having parallel finned cooling tubes welded together to define an all welded combustion chamber construction, wherein the amount of cooling surface in the upright section is sufficient to cool the combustion gases to temperatures compatible with requirements of the heat recovery section.

References Cited

UNITED STATES PATENTS

| | | | |
|---|---|---|---|
| 1,916,713 | 7/1933 | Bennett | 122—376 X |
| 1,973,697 | 9/1934 | Bailey | 110—10 |
| 1,973,705 | 9/1934 | Hardgrove et al. | 110—10 |
| 2,029,576 | 2/1936 | Kolb | 110—15 |
| 2,057,450 | 10/1936 | Schrenk | 110—10 |
| 3,277,870 | 10/1966 | Reale | 122—6 |

JAMES W. WESTHAVER, *Primary Examiner.*

UNITED STATES PATENT OFFICE
CERTIFICATE OF CORRECTION

Patent No. 3,393,652　　　　　　　　　　　　　　　　　　July 23, 1968

John M. Connell

It is certified that error appears in the above identified patent and that said Letters Patent are hereby corrected as shown below:

Column 1, line 47, "coffe" should read -- coffee --. Column 2, line 23, "drawings" should read -- drawing --. Column 6, line 11, cancel "[at at least two longitudinally"; line 12, cancel "spaced apart intervals]".

Signed and sealed this 27th day of January 1970.

(SEAL)
Attest:

Edward M. Fletcher, Jr.　　　　　　　　　　　　　WILLIAM E. SCHUYLER, JR.
Attesting Officer　　　　　　　　　　　　　　　　　Commissioner of Patents